(No Model.)
H. COKER.
CLUTCH MECHANISM.
No. 247,169. Patented Sept. 20, 1881.
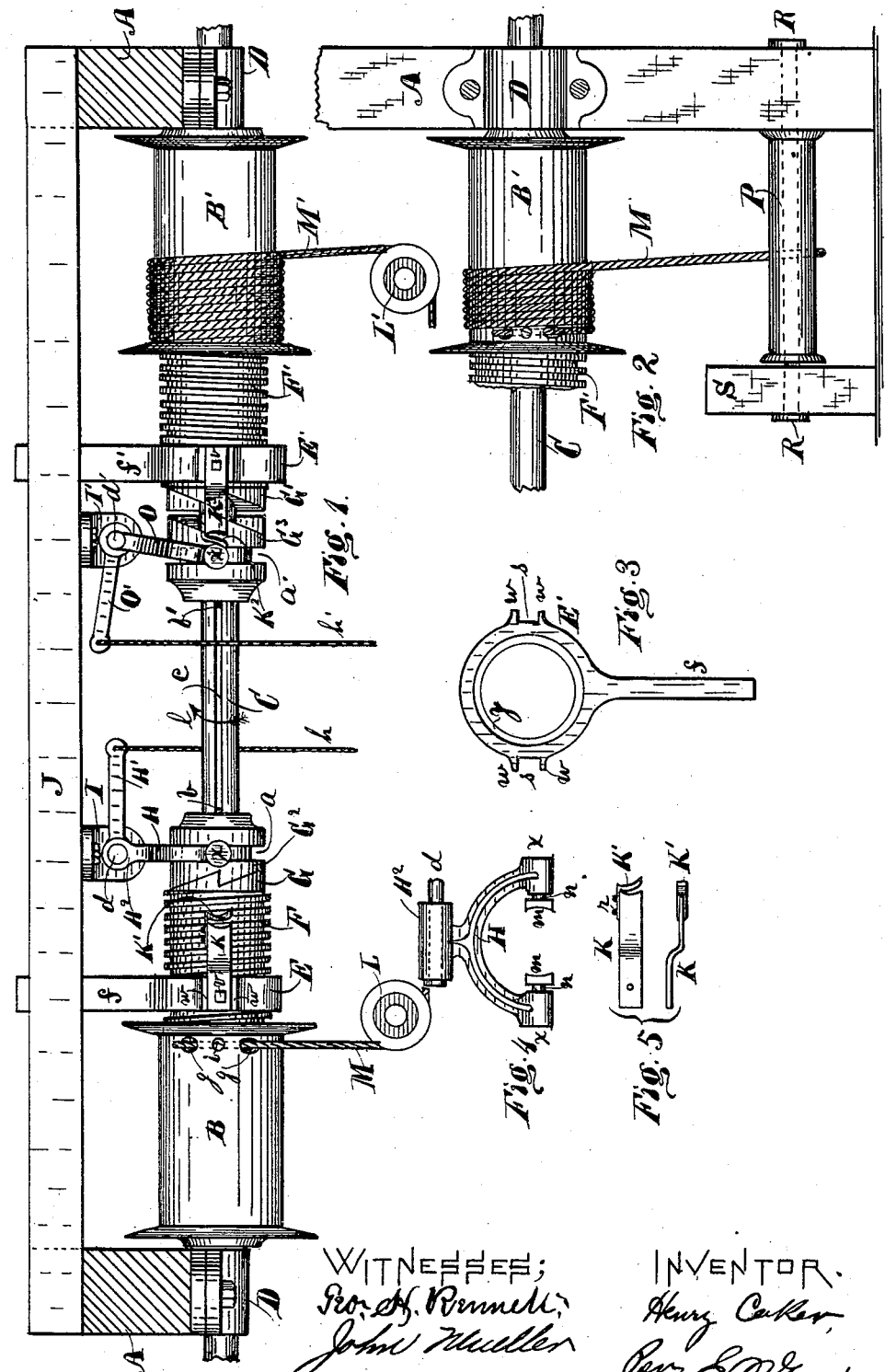

UNITED STATES PATENT OFFICE.

HENRY COKER, OF INDIANAPOLIS, INDIANA.

CLUTCH MECHANISM.

SPECIFICATION forming part of Letters Patent No. 247,169, dated September 20, 1881.

Application filed May 13, 1881. (No model.)

*To all whom it may concern:*

Be it known that I, HENRY COKER, a citizen of the United States, residing at Indianapolis, in the county of Marion and State of Indiana, have invented a new and useful Clutch Mechanism for Operating Shovels used in Unloading Grain-Cars, of which the following is a specification.

My invention relates to improvements in clutch mechanism for operating grain-shovels during the act of unloading cars, in which a rotatable shaft is provided with two loose spools, each spool having an independent screw-thread and clutch-coupling at one end, which operate in conjunction with clutch-couplings feathered to the main shaft; also, a pair of tang-nuts operating on the screws, with spring-disconnectors for forcing the feathered couplings out of gear from the couplings on the spools; and the object of my invention is to provide a clutch-coupling for operating grain-shovels in grain-cars for removing the grain from the cars. This object I accomplish by the mechanism illustrated in the accompanying drawings, in which—

Figure 1 represents a top view of the entire machine. Fig. 2 is an upright view of a portion of the apparatus. Fig. 3 is a plan view of one of the tang-nuts used for disconnecting the couplings. Fig. 4 is a side view of the forked end of one of the bell-cranks, and Fig. 5 represents a top and side view of the pusher and spring used for disconnecting the couplings.

Similar letters throughout the various views refer to like parts.

A A represent upright posts, to the front sides of which are secured the journal-boxes D D, and to the rear sides the horizontal guide-bar J is secured. The shaft C is mounted in the boxes D D, and said shaft at each end, between the boxes D D, is provided with spools B B'. The spool B has at its inner end a screw-threaded part, F, and at the end of the screw F is a clutch-coupling, G, all of which is snugly fitted to the shaft C, yet loose enough to permit said shaft to revolve in the spool. Immediately beyond the clutch G the shaft C is provided with a horizontal adjustable clutch-coupling, $G^2$, which is secured to said shaft by the feather $b$, which operates in the keyway $c$ and revolves when the shaft revolves. The clutch-coupling $G^2$ is provided with a groove, $a$, turned in its periphery, in which the dogs $m$ $m$, Fig. 4, operate.

The bell-crank H has a fork at one end, with hubs $x$ $x$, in which the round shanks $n$ $n$ of the dogs $m$ $m$ operate. From the hub $H^2$, on one side, projects the arm H', and the hub $H^2$ is supported on a suitable bracket, I, by the stud $d$. The outer end of the arm H' has a small pull-rope, $h$, attached, as shown.

On the screw F is the nut E, with a tang, $f$, projecting rearward, to operate in the guide J and prevent the nut from turning on the screw F. The nut E is provided with one or two notched recesses, $s$, formed between the flanges $w$ $w$. One recess $s$ is sufficient; but two may be used, if required. In the recess $s$ is secured by the bolt $v$ the pusher K, Figs. 1 and 5, said pusher being a bar of suitable material, having on its projecting end a spring, K', made fast to the pusher K by the bolts $r$, the operation of which will be hereinafter described.

The spool B is provided, near one flange, with a hole, $g$ $g$, in which the rope M is made fast by the screw $i$, thus forming a means for fastening the rope, and for lengthening or shortening it at pleasure. In Fig. 2 the rope M is shown as leading down from the spool B' and passing around the roller P, which is mounted on the shaft R, near the floor. From this roller P (one being under each spool B B', Fig. 1) the rope passes around a sheave, L, to the interior of a car, and to the end of the rope in the car the ordinary grain-shovel is attached.

The mechanism at both ends of the device—*i. e.*, the spools B B', nuts E E', screws F F', couplings G $G^2$ G' $G^3$, and bell-crank H O, and their operating mechanism—are alike, except the screw F' and its nut E', which are left-hand, and the clutch-couplings $G^2$ G' reversed.

In operating my improved apparatus, power is applied to the shaft C, rotating it in one direction—for instance, in the direction of the arrow $l$—the ropes M M' passing around their respective sheaves L L' into a car, with shovels attached, and the small hand-lines $h$ $h$ also leading into the car for the operator to handle. The spool B represents all the rope unwound, and indicates that the operator, with the shovel, is at the farther end of the car. The operator, when ready to move the load, pulls the cord $h$, which operates the bell-crank H H', and throws the clutch-coupling $G^2$ into gear with the clutch G. The spool B then begins to revolve, winding up the rope M, and drawing the shovel toward the discharge. At the same time the screw F operates the nut E, and said nut is moved toward the end of the screw, when the curved spring K' of the pusher K comes in contact with the hub $x$ of the bell-crank H. The spring is compressed against the end of the pusher, and the pusher as it advances pushes the coupling $G^2$ out of gear from the coupling G. Just at the point where the pusher K disengages the couplings the spring K', reacting, pushes the coupling $G^2$ far enough away from the coupling G to prevent the couplings from striking together, as shown by the couplings $G^3$ G' on the screw F' of the spool B'. Thus the rope is wound up, the load before the shovel discharged, and the spool B', for instance, is free to have its rope unwound whenever the operator moves away from said spool with the shovel. As the operator moves the shovel away from the spool the rope M' turns the spool in unwinding, thus causing the screw F' to move the nut E' toward the spool, ready to operate again, when power is applied to move the grain and release the clutch-couplings, when the load is discharged.

What I claim as new, and desire to secure by Letters Patent, is—

1. The spool B, with holes $g$ and set-screw $i$, for holding the rope M, substantially as shown and described.

2. The spool B, having at one end the screw F, and coupling G, combined with the tang-nut E, coupling $G^2$, spring-pusher K K', and hub $x$ of the bell-crank H H', substantially as shown and described.

3. The nut E, with flanged recesses $s$ and tang $f$, combined with the pusher-bar K K', substantially as shown and described.

4. The bell-crank H, with arm H', and fork having hubs $x\ x$, combined with the dogs $m\ m$, the coupling $G^2$, and rope $h$, substantially as shown and described.

In testimony whereof I have signed my name to this specification in the presence of two subscribing witnesses.

HENRY COKER.

Witnesses:
 E. O. FRINK,
 GEORGE H. RENNETT.